Patented Oct. 4, 1949

UNITED STATES PATENT OFFICE 2,483,416

PROCESS FOR THE PREPARATION OF BETA (HETEROCYCLIC-THIO) CARBOXYLIC ACID COMPOUNDS

Jacob Eden Jansen and Roger A. Mathes, Akron, Ohio, assignors to The B. F. Goodrich Company, New York, N. Y., a corporation of New York No Drawing. Application October 5, 1945, Serial No. 620,662

9 Claims. (Cl. 260—302)

This invention relates to a new class of beta-substituted carboxylic acid compounds and to a method of preparing the same. More specifically it pertains to carboxylic acids having in beta-position to the carboxyl group a thio linkage connected to a nitrogen containing heterocyclic radical, to the salts of such acids, and to the preparation of these compounds by the reaction of nitrogen-containing heterocyclic mercaptans with beta-lactones.

It is disclosed in U. S. Patent 2,356,459 to Frederick E. Küng that beta-lactones, that is lactones or inner esters of beta-hydroxy carboxylic acids may be obtained in good yields by the reaction of a ketene with an aldehyde or ketone. In this manner beta-propiolactone, also called hydracrylic acid lactone, which has the structure

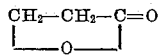

is economically obtained from ketene and formaldehyde.

The copending application of Thomas L. Gresham and Forrest W. Shaver, Ser. No. 620,660, filed October 5, 1945, now U. S. Patent 2,449,992, discloses that beta-propiolactone, and also the other beta-lactones, will react with mercaptans in general to produce beta-thio carboxylic acid compounds, but this application is not specific to heterocyclic mercaptans.

We have discovered that nitrogen-containing heterocyclic mercaptans, either as such or in the form of their salts, react with beta-propiolactone, and also the other beta-lactones, to produce in high yields a new class of beta-substituted carboxylic acid compounds characterized by the presence of a thio, —S—, linkage directly attached on the one hand to a ring carbon atom of a nitrogen-containing heterocyclic radical and on the other hand to a carbon atom in beta position to the carboxylic acid group; and that such compounds possess properties which render them useful in organic synthesis, in the rubber and plastics and other chemical industries, as biologically and physiologically active agents and for a number of other purposes.

The reaction proceeds in general as indicated by the following equation:

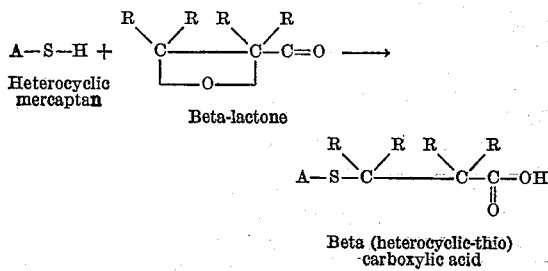

where A is a nitrogen-containing heterocyclic radical having its connecting valence on a carbon atom in the heterocyclic ring; R is hydrogen or a substituent group and H is replaceable by a salt-forming group.

No special conditions for the reaction are necessary, the reaction proceeding whenever it is possible to bring the reactants into effective contact with one another. Thus, simply by mixing the heterocyclic mercaptan and the beta-lactone and refluxing the mixture in the absence of added materials or in the presence of an inert solvent or diluent such as benzene, it is possible to obtain the desired beta (heterocyclic-thio) carboxylic acid. Higher yields, however, are generally secured by employing a polar solvent in which the lactone is soluble, such as water, and carrying out the reaction in the presence of a base which reacts with the mercaptan to produce a salt of the mercaptan which is soluble in the solvent. When the reaction is effected in this way it is preferable first to prepare an aqueous solution of the mercaptan and an inorganic base such as an alkali metal hydroxide or ammonium hydroxide (that is an aqueous solution of a salt of the mercaptan) and then to add the beta-lactone to this solution, the mercaptan salt reacting with the beta-lactone to produce a salt of the beta (heterocyclic-thio) carboxylic acid, from which the free acid is liberated as an insoluble precipitate or oil on addition of mineral acid to the solution.

As illustrated by the equation, one molecular proportion of beta-lactone for each molecular proportion of the heterocyclic mercaptan is theoretically required for the reaction and substantially this amount is preferably employed but an excess of either of the reactants may be used if desired without any appreciable influence on the yield of product. Similarly, the amount of base if such material is used, is preferably chemically equivalent to that of the mercaptan or, if desired, is in excess of this amount. When a base is used and the reaction yields, as the initial product, a solution of the salt of the beta (heterocyclic-thio) carboxylic acid, it is possible for this carboxylic acid salt to react with excess beta-lactone in the manner described in the copending application of Thomas L. Gresham and Jacob Eden Jansen, Serial No. 620,658 filed October 5, 1945, now U. S. Patent 2,449,990, but this side reaction does not occur so long as there remains any unreacted mercaptan salt, and hence does not introduce any substantial complications.

Other conditions for the reaction such as temperature and pressure are not critical and may be varied widely. Highest yields of the desired product are generally secured when working at temperatures from 0 to 100° C., preferably from 0 to 50° C., and at atmospheric pressure. The most convenient temperature, especially when the reaction is carried out in aqueous solution, is from about 20 to 50° C. since the reaction is exothermic and this temperature is maintained without appreciable heating or cooling of the solution. Temperatures as low as −20° C. or even lower or as high as 200° C. or even higher, however, are also operable.

Any desired nitrogen-containing heterocyclic mercaptan that is, a compound having a mercapto group attached to a carbon atom of a ring structure including nitrogen and carbon atoms, may be used in the reaction with the beta-lactone. Thus, mercapto-thiazoles, mercapto-thiazolines, mercapto-oxazoles, mercapto-oxazolines, mercapto-imidazoles, mercapto-imidazolines, mercapto-thiodiazoles, mercapto-thiazines, mercapto-quinolines, mercapto-pyridines, mercapto-pyrimidines, and similar compounds may all be utilized in this invention. Especially high yields of valuable compounds are secured when the heterocyclic mercaptan is one which contains a mercapto group attached to a carbon atom of a heterocyclic ring which is directly adjacent to a ring nitrogen atom, and also preferably, is directly adjacent to a ring sulfur or oxygen atom, as in the 2-mercapto thiazoles, 2-mercapto-thiazolines, 2-mercapto oxazines, 2-mercapto thiazines and the like. Such compounds will ordinarily be made up of a plurality of carbon and hydrogen atoms, a single nitrogen atom, and two sulfur atoms or one sulfur and one oxygen atom, but additional sulfur, oxygen or nitrogen atoms or halogen atoms or other atoms present in substituent groups such as halogen, nitro, oxy, hydroxy, thio, cyano, acyl, acyloxy, keto, amino, carboxy, sulfo, and the like may also be present if desired. When substituent groups which contain hydrogen not connected to carbon, as in hydroxy, carboxy and amino groups, are present the beta-lactone may also react with the substituent group thereby complicating the reaction; hence the use of heterocyclic mercaptans in which all hydrogen atoms except those attached to carbon atoms are present in mercapto groups, is preferred.

Beta-propiolactone, the simplest possible beta-lactone, is the preferred beta-lactone for use in this invention because of its low cost, and the ease with which it reacts with heterocyclic mercaptans to produce beta-(heterocyclic-thio) propionic acid compounds. However, the homologs of beta-propiolactone, that is, other saturated aliphatic beta-lactones such as beta-butyrolactone, beta-isobutyrolactone, beta-valerolactone, beta-isovalerolactone, beta-n-caprolactone, alpha-ethyl - beta - propiolactone, alpha - isopropyl-beta-propiolactone, alpha-butyl-beta-propiolactone, alpha-methyl-beta-butyrolactone, alpha-ethyl - beta - butyrolactone, beta - methyl - beta-valerolactone and the like may also be used, as may other beta-lactones, to produce numerous other beta (heterocyclic-thio) carboxylic acid compounds. Other known beta-lactones include lactones of beta-hydroxy-monocarboxylic acids containing cycloalkyl, aryl and aralkyl substituents such as beta-cyclohexyl-beta-propiolactone, beta-phenyl-beta-propiolactone, alpha-phenyl - beta - propiolactone, beta-benzyl-beta-propiolactone and the like, all of which, like beta-propiolactone and its homologs, are of the general structure

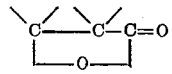

wherein R is hydrogen or an unreactive hydrocarbon group (i. e., a hydrocarbon group free from aliphatic unsaturation) and may be prepared in the manner described in the above-mentioned Küng patent. Still other known beta-lactones include lactones of unsaturated beta-hydroxy carboxylic acids, mono-beta lactones of dicarboxylic acids and dilactones of dicarboxylic acids in which at least one of the lactones is beta, examples of which are alpha, alpha-dimethyl-beta-propiolactone-beta-carboxylic acid; trimethyl-beta-propiolactone-beta-carboxylic acid; beta, beta-dimethyl - beta - propiolactone - alpha - carboxylic acid; trimethyl-beta-propiolactone-alpha-carboxylic acid and the beta-delta-dilactone of citrylidene mulonic acid, all of which like the beta-lactones before mentioned are composed exclusively of hydrogen, carbon and carbonoxy

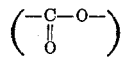

oxygen atoms. In addition to these compounds other compounds containing the structure

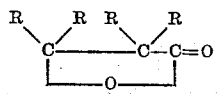

but having the valences on the alpha and beta carbons attached to groups containing elements other than or in addition to carbon and hydrogen such as oxygen, nitrogen, sulfur and halogen, whether in essentially unreactive structure such as nitro groups and ether linkages or in radicals containing reactive hydrogen such as amino and hydroxy, are also beta-lactones and hence are included within the generic class of beta-lactones. Examples of such latter compounds are alpha or beta-nitrophenyl-beta-propiolactone; beta (O-nitro-m-chlorophenyl)-beta-propiolactone; beta-(O - nitro - m - methoxyphenyl) - beta - propiolactone; alpha-hydroxy-beta-phenyl-beta-propiolactone and alpha-bromo-beta, beta-dimethyl-beta-propiolactone-alpha-carboxylic acid.

Thus, any of the generic class of beta-lactones may be used in the practice of this invention. When the reaction is carried out in aqueous solution, as is preferred, beta-lactones which are soluble in water (those beta-lactones containing no more than about six carbon atoms possess this property) are of course used.

The beta (heterocyclic-thio) carboxylic acids obtained by the reaction, and also the salts thereof which are obtained in solution in a preferred manner of carrying out the reaction (i. e., when the reaction is effected by reacting a salt of the mercaptan, formed from the mercaptan and a base, with the beta-lactone), are all highly useful compounds. The free acids, which are generally obtained as finely-divided solid materials insoluble in water but soluble in organic solvents, are especially useful as accelerators and activators for the vulcanization of natural and synthetic rubbers, as modifiers for the polymerization of butadiene-1,3 hydrocarbons, as fungicides, insecticides, plant growth regulators and for other purposes. Water-soluble salts of these acids such as the ammonium and alkali metal salts are useful in solution as fungicides, insecticides and plant growth regulators as well as for other purposes. Salts of these acids with polyvalent metals such as zinc, cadmium, mercury, lead, calcium, barium, iron and the like, which may be prepared by reacting mercaptan salts of such metals with beta-lactones in a polar solvent capable of dissolving the reactants, or by a metathetical reaction in aqueous solution between a water-soluble salt of such a metal and a water-soluble salt of the beta (heterocyclic-thio) carboxylic acid, are also useful as activators and accelerators of vulcanization. All of these beta (heterocyclic-thio) carboxylic acid compounds, including the free acids and their salts, are characterized by possessing a sulfur atom connected on the one hand to a ring carbon atom of a nitrogen-containing heterocyclic radical and on the other hand to a carbon atom in beta position to a carboxylic function consisting of a carbonyl group attached to an oxygen atom which is in turn attached to a positive radical of an ionizable compound, such as hydrogen (the positive radical of acids and water) or an ammonium, substituted ammonium or metallic radical (all of which are positive radicals found in bases and salts).

Of these compounds, the beta (heterocyclic-thio) propionic acid compounds are particularly important because of their especial utility and because they may be prepared at low cost from heterocyclic mercaptans and beta-propiolactone. Such compounds possess the formula

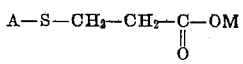

wherein A is a nitrogen containing heterocyclic radical having its connecting valence on a ring carbon atom, preferably a ring carbon atom directly adjacent to a ring nitrogen atom and more preferably one which is directly intermediate between a ring nitrogen and a ring sulfur atom; and M is hydrogen (in which case the compounds are acids) or a positive salt forming group (in which case the compounds are salts).

It should also be mentioned that the above-described beta-substituted carboxylic acids and their salts are of value as intermediates in the preparation of other compounds. For example, the beta-substituted acids may be reacted with alcohols to produce esters, with ammonia and amines to produce amides, etc.

In order further to illustrate the compounds of this invention and their method of preparation, the following specific examples are set forth but it is to be understood that the invention is not limiited thereto. Unless otherwise indicated the parts are by weight.

*Example 1*

An aqueous sodium hydroxide solution is prepared from 42 parts of the base and 200 parts of water. 119 parts of 2-mercapto-thiazoline are added to this solution after which 72 parts of beta-propiolactone are added with stirring over a period of about 20 minutes, the temperature of the solution during the addition being from 27 to 34° C. The solution obtained contains a practically quantitative yield of the sodium salt of beta(2-thiothiazolinyl) propionic acid, and is useful as a fungicide and insecticide.

*Example 2*

The procedure of Example 1 is repeated. The solution obtained after the addition of beta-propiolactone, is then neutralized with concentrated hydrochloric acid whereupon an oil separates out as a lower layer. The oil is separated from the water layer, dissolved in ether and the aqueous layer extracted with ether. The ether solutions are then combined and the ether distilled whereupon 176 parts (92%) of a viscous yellow oil which crystallizes on standing and which is identified as beta (2-thiothiazolinyl) propionic acid is obtained.

When the above example is repeated using other 2-mercapto thiazolines such as 2-mercapto-5-methyl-thiazolines, 2-mercapto-4-ethyl-thiazoline, 2-mercapto-4,5-dimethyl-thiazoline, 2-mercapto-4,5-tetramethylene-thiazoline, 2-mercapto-4-phenyl-thiazoline and 2-mercapto-4-methoxy-thiazoline, the corresponding beta (2-thiothiazolinyl) propionic acids, which possess properties similar to the specific beta (2-thiothiazolinyl) propionic acid described above, are similarly obtained in high yields.

*Example 3*

217 parts of a mixture of 2-mercapto-4,5-dimethyl thiazole and 2-mercapto 4-ethyl thiazole and 63 parts of sodium hydroxide are added to 350 parts of water. 108 parts of beta-propiolactone are then added with stirring over a period of 20 minutes and while maintaining the reaction temperature at about 30° C. The resulting clear solution is then neutralized by the addition of concentrated hydrochloric acid whereupon a layer of water-insoluble oil is formed. The oil is separated from the water, taken up in ether, the ether solution washed with water and the ether finally evaporated. 183 parts of a reddish oil, which was identified as containing a mixture of beta (2-thio-4,5-dimethyl-thiazyl) propionic acid and beta (2-thio-4-ethyl-thiazyl) propionic acid, is obtained.

When the example is repeated using in place of the thiazoles set forth, other 2-mercapto thiazoles such as 2-mercapto-4-phenyl thiazole, 2-mercapto-4-methoxy thiazole, 2-mercapto-4-p-nitrophenyl thiazole, 2-mercapto-4-o-chlorophenyl thiazole and the like, similar beta (2-thiothiazyl) propionic acids are secured.

*Example 4*

In the manner of the preceding example, 108 parts of beta-propiolactone are added to a solution containing 300 parts of water, 250.5 parts of 2-mercapto-benzothiazole and 63 parts of sodium hydroxide. On acidification of the reaction product a precipitate is formed which is filtered and found to consist of 329 parts (91.8%) of beta (2-thio-benzothiazyl) propionic acid (M. P. 142–144° C.).

*Example 5*

108 parts of beta-propiolactone are again added to a solution containing 300 parts of water, 250.5 parts of 2-mercapto-benzothiazole and 63 parts of sodium hydroxide. The resulting clear solution is then admixed with a solution of 256 parts of lead nitrate dissolved in 1000 parts of water whereupon a light yellow precipitate is formed. The precipitate, which consists of the lead salt of beta (2-thio-benzothiazyl) propionic acid is obtained in quantitative yield.

*Example 6*

173 parts of 2-mercapto-4,6,6-trimethylthiazine of the structure

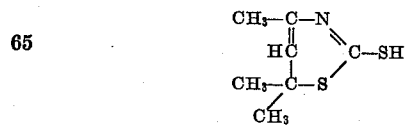

(obtained by the reaction of mesityl oxide and dithiocarbamic acid as described in Example I of the copending application of Jacob Eden Jansen, Serial No. 557,384, filed Oct. 5, 1944, now U. S. Patent 2,440,095), are dissolved in an aqueous solution containing 80 parts of sodium hydroxide and 300 parts of water. 72 parts of beta-propiolactone are then added over a period of about 25 minutes with stirring, keeping the temperature of the solution at 25-30° C. On acidification of the solution, a product separates as a red brown viscous oil, which is taken up in ether, the ether solution washed with water, and the oil redeposited by evaporation of the ether. The product consists of beta (2-thio-4,6,6-trimethylthiazinyl) propionic acid of the structure:

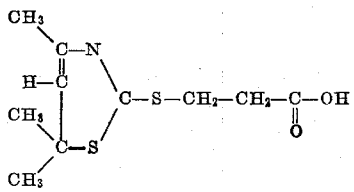

Although the above specific examples illustrate the invention in preferred embodiments, the invention is not limited solely thereto for numerous variations and modifications in accordance with the above disclosure and the skill of the art are included within the spirit and scope of the invention as defined in the appended claims.

We claim:

1. The method of preparing beta (heterocyclicthio) carboxylic acid compounds which comprises dissolving a nitrogen-containing heterocyclic mercaptan in which the nitrogen is present in the heterocyclic ring in an alkaline aqueous solution and reacting the solution with a water soluble saturated aliphatic beta-lactone.

2. The method of preparing beta (heterocyclicthio) propionic acid compounds which comprises dissolving a nitrogen-containing heterocyclic mercaptan in which the nitrogen is present in the heterocyclic ring in an aqueous solution of an alkali and then adding beta-propiolactone to the solution.

3. The method of preparing beta (heterocyclicthio) carboxylic acids which comprises dissolving a heterocyclic mercaptan having a mercapto group attached to a carbon atom in a heterocyclic ring, said carbon atom being directly adjacent to a nitrogen atom in the said ring, in an aqueous solution of an inorganic base, reacting the solution with a water-soluble saturated aliphatic beta-lactone and then acidifying the solution.

4. The method of preparing beta (heterocyclicthio) propionic acid compounds which comprises preparing a solution containing a heterocyclic mercaptan having a mercapto group attached to a carbon atom in a heterocyclic ring said carbon atom being directly intermediate a nitrogen atom and a sulfur atom in said ring, dissolved in an aqueous solution of an alkali, and adding beta-propiolactone to the solution.

5. The method of claim 1 wherein the heterocyclic mercaptan is a 2-mercaptothiazole.

6. The method of claim 1 wherein the heterocyclic mercaptan is a 2-mercaptothiazoline.

7. The method of claim 1 wherein the heterocyclic mercaptan is 2-mercaptobenzothiazole.

8. The method of preparing beta (2-thiothiazolinyl) propionic acid which comprises preparing a solution containing 2-mercapto-thiazoline dissolved in an aqueous solution of an alkali, reacting the solution with beta-propiolactone and then acidifying the solution.

9. The method of preparing beta (2-thiobenzothiazyl) propionic acid which comprises preparing a solution containing 2-mercapto-benzothiazole dissolved in an aqueous solution of an alkali, reacting the solution with beta-propiolactone and then acidifying the solution.

JACOB EDEN JANSEN.
ROGER A. MATHES.

REFERENCES CITED

The following references are of record in the file of this patent:

UNITED STATES PATENTS

| Number | Name | Date |
|---|---|---|
| 2,397,960 | Gribbins et al. | Apr. 9, 1946 |
| 2,407,138 | Clifford | Sept. 3, 1946 |
| 2,413,917 | Harmon | Jan. 7, 1947 |

FOREIGN PATENTS

| Number | Country | Date |
|---|---|---|
| 845,793 | France | Sept. 1, 1939 |

OTHER REFERENCES

Universitas Ludensis Acta Nova Series (Johansson), 2 Afd., vol. 12 (1916), pp. 22-24.

Certificate of Correction

October 4, 1949

Patent No. 2,483,416

JACOB EDEN JANSEN ET AL.

It is hereby certified that errors appear in the printed specification of the above numbered patent requiring correction as follows:

Column 1, lines 50 to 53 inclusive, for that portion of the equation reading 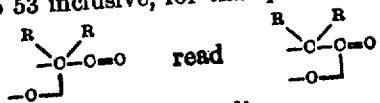 column 6, line 2, for "thiazolines" read *thiazoline*; and that the said Letters Patent should be read with these corrections therein that the same may conform to the record of the case in the Patent Office.

Signed and sealed this 23rd day of May, A. D. 1950.

[SEAL]

THOMAS F. MURPHY,
*Assistant Commissioner of Patents.*